United States Patent [19]
Natkin

[11] 4,302,985
[45] Dec. 1, 1981

[54] PHASE CONTROLLING SYSTEM FOR TWO ROTATABLE SHAFTS

[75] Inventor: Robert J. Natkin, Dearborn, Mich.

[73] Assignee: Ford Motor Company, Dearborn, Mich.

[21] Appl. No.: 106,137

[22] Filed: Dec. 21, 1979

[51] Int. Cl.³ .................. F16H 35/06; F01L 1/34; F16D 3/10
[52] U.S. Cl. ....................... 74/403; 64/27 CS; 123/90.15; 474/900
[58] Field of Search .................. 474/900; 64/24, 25, 64/27, 27 CS; 123/90.15; 74/403

[56] References Cited

U.S. PATENT DOCUMENTS

| | | | |
|---|---|---|---|
| 1,787,717 | 1/1931 | Bowlet | 123/90.27 |
| 2,839,036 | 6/1958 | Strang | 123/73 R |
| 3,401,572 | 9/1968 | Bailey | 74/395 |
| 3,502,059 | 3/1970 | Davis et al. | 123/90.15 |
| 3,523,465 | 8/1970 | Harrel | 74/568 R |
| 3,626,720 | 12/1971 | Meacham et al. | 64/25 |
| 3,732,745 | 5/1973 | Jackson | 74/325 |
| 3,827,413 | 8/1974 | Meacham | 123/90.15 |
| 3,888,216 | 6/1975 | Miokovic | 123/90.15 |
| 3,945,221 | 3/1976 | Miokovic | 64/24 |
| 4,096,836 | 6/1978 | Kopich | 74/395 |
| 4,177,773 | 12/1979 | Cribbs | 123/90.15 |

Primary Examiner—C. J. Husar
Assistant Examiner—Conrad Berman
Attorney, Agent, or Firm—Steven L. Permut; Clifford L. Sadler

[57] ABSTRACT

A valve timing device for an internal combustion engine includes a hub with an internal helical groove which engages a tracking post extending from a cylindrical surface of a crankshaft. A locking cap is placed at the outer end of the crankshaft spaced apart from the hub with a compression spring wrapped about the crankshaft between the hub and the locking cap. A sprocket is keyed onto the hub and trained about a chain which is drivingly trained about a conventional camshaft. As the crankshaft speed is increased, inertial loads of the camshaft causes the sprocket and hub to rotate relative to the crankshaft which axially moves the hub a predetermined amount along the crankshaft to compress the spring until the resilient forces of the spring counterbalances the inertia forces of the camshaft.

As the hub is angularly positioned, the camshaft becomes angularly retarded relative to the crankshaft such that the valve operation is delayed with respect to the piston operation as the engine speed increases.

12 Claims, 11 Drawing Figures

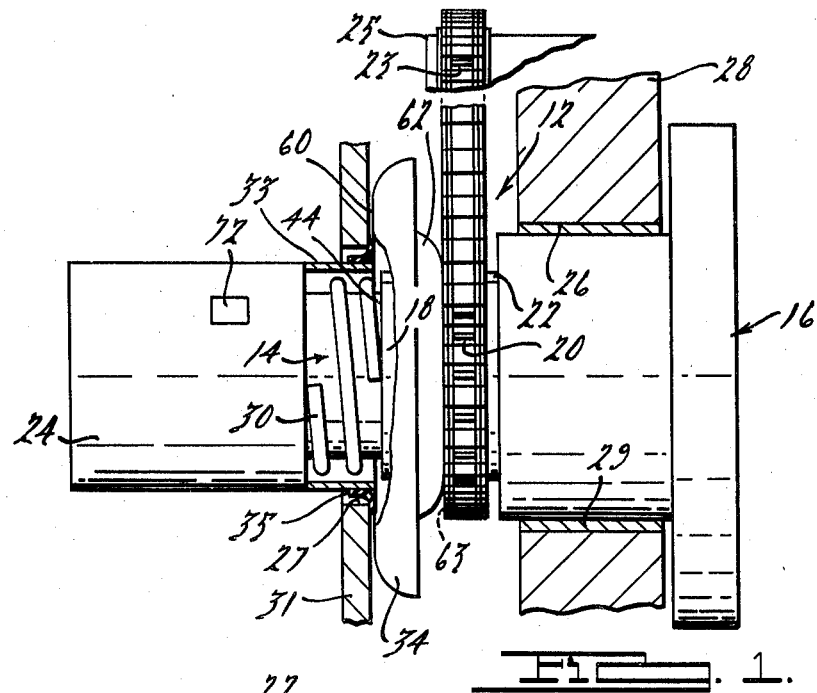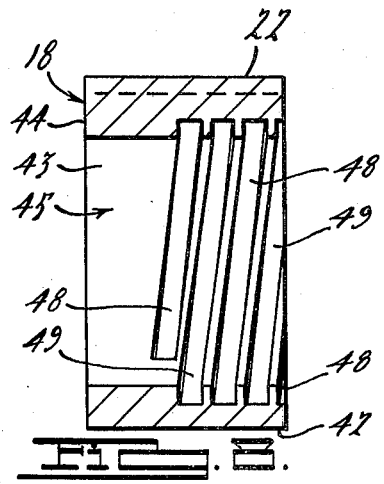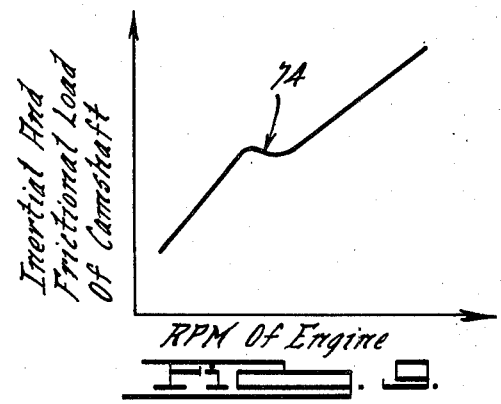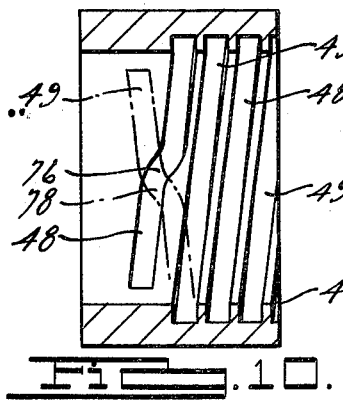

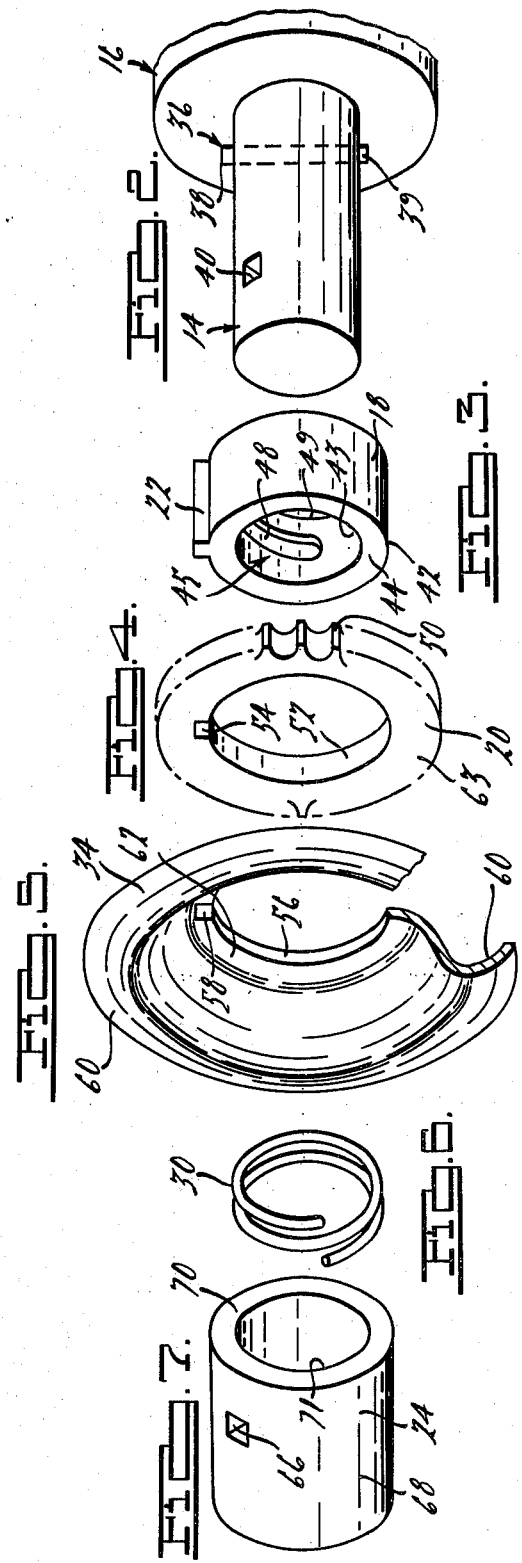

PHASE CONTROLLING SYSTEM FOR TWO ROTATABLE SHAFTS

BACKGROUND OF THE INVENTION

1. Field of the Invention

This invention relates to a phase controlling device for a camshaft driven from a crankshaft of an internal combustion engine.

2. Description of the Prior Art

Internal combustion engines undergo a variety of conditions in which it is desirous to adjust the opening and closing times of the intake and exhaust valves with respect to the phases of the piston stroke. For instance, in a piston operated internal combustion engine, it is desirous to have the intake valves open as soon as possible during low speeds, and during high speeds it is desirous to retard the valve openings with respect to the piston stroke such that the opening of the exhaust valve is later to provide a longer power stroke.

Certain devices have been devised to attempt to bring about the advantages of valve retardation during high engine speeds. One such device is disclosed in U.S. Pat. No. 3,945,221 issued on Mar. 23, 1976 to Miokovic. The Miokovic patent discloses a coaxially mounted driving shaft and camshaft with a set of toothed pivoting arms engaging a gear mounted at the end of the camshaft. The pivoting arms are pivotable about a pin and are moved by a lever which is connected to a sliding member splined on the driving shaft. Axial movement of the spline member about the driving shaft causes the toothed arms to pivot to change the relationship of the driving shaft with respect to the camshaft.

U.S. Pat. No. 3,888,216 issued on June 10, 1975 also to Miokovic discloses a second system for controlling the opening and closing of the intake and exhaust valves. The device has two rocker arms which engage each of two rotatable shafts having cams thereon which are driven by the crankshaft of the internal combustion engine. Each camshaft has spiral fins upon which gears are splined thereupon. The two gears mesh with each other. In addition, the gears are in engagement with a fork which axially moves the gears along the camshafts to change relative phases of one camshaft with respect to the other. The fork is actuated by a hydraulic piston type actuator.

Another hydraulic actuated timed controlled system is disclosed in U.S. Pat. No. 3,827,413 issued on Aug. 6, 1974 to Meachum. The Meachum patent discloses a parallel crankshaft and camshaft which are connected by a drivechain. The chain is trained around a sprocket operably splined about an inner race. A complementary outer race is fitted thereabout with axially extending grooves therein. The inner race has angular extending slots. Ball bearings are seated within the grooves and slots. A hydraulic system axially moves the inner race with respect to the outer race to angularly position the sprocket with respect to the camshaft. In this way the crankshaft and camshaft are phase controlled.

A speed sensitive timing device is disclosed in U.S. Pat. No. 3,401,572 issued to Bailey on Sept. 17, 1968 which operably connects a crankshaft to a camshaft which drives a fuel injection pump. The timing device has a vortex pump which is speed dependent. Operation of the pump causes a helical splined gear to axially move through an axially fixed gear against a force of a return spring axially biased between the gear and camshaft. The helical splines cause the camshaft to rotate as the gear axially moves. The gear is operably driven by the crankshaft. As the crankshaft increases speed, the pump forces the gear to axially move against the force of the return spring and retarding torque of the camshaft thereby rotating to advance the camshaft relative to the crankshaft.

A simple, economical and easily packaged timing device is needed that is independent of servo-mechanisms and hydraulics which can retard the timing of a camshaft with respect to a crankshaft.

SUMMARY OF THE DISCLOSURE

Broadly, a phase controlling system, according to the disclosure has a rotatable driving shaft and a driven member, preferably a rotatable driven shaft. In addition, a drive member preferably a sprocket or gear or other type of cogwheel is drivingly engaged to the driven shaft and drivenly engaged to the driving shaft. The hub of the driving member is coaxially mounted about one of the shafts for rotational and axial adjustment relative thereto. The hub and the one shaft have a tracking device interposed therebetween for calibrating angular movement of the hub for a given amount of axial movement along the shaft and for converting an angular force of the inertial loads of the driven shaft into a longitudinally directed force along the one shaft.

Further, according to the invention, a spring is operably connected to the hub for controlling its axial movements in response to inertial and frictional loads on the driven shaft to allow predetermined angular and axial changes of the hub about the coaxial shaft. The spring has a sufficient stiffness to not be displaced by the normal angular acceleration and deceleration of the driving shaft.

One application for such a device is in an internal combustion engine to control valve timing. In one engine the camshaft which operates the valves is driven off the crankshaft by means of a chain. The phase control device is interposed between the crankshaft and the chain which drives the camshaft whereby the relative angular position of the crankshaft and chain (and hence the camshaft) can be changed to thereby alter the valve timing.

The valve timing is delayed as engine speed increases. By retarding valve timing at higher engine speeds, a larger power stroke is possible by delaying the opening of the exhaust valves until the piston reaches its bottom dead center position. In addition, the advantages of opening the intake valves as soon as possible when the engine is running at slow speeds, namely; to allow as much air and gaseous vapors in by the suction caused by the piston on its downward stroke, is retained without compromise.

In the presently preferred embodiment the track comprises a recessed helical groove within a central bore of the hub which engages a tracking post radially extending from the outer cylindrical surface of the crankshaft.

The spring may be a coil compression spring coaxially mounted about the crankshaft with one end abutting the hub and another end abutting a radially extending shoulder fixed to the crankshaft. Axial movement of the hub along the crankshaft is directed to load against the compression spring until the axial load on the hub balances the load exerted by said spring for a given rotational speed of the crankshaft and camshaft.

BRIEF DESCRIPTION OF THE DRAWINGS

The description of the preferred embodiments of the invention will now be described with respect to the drawings, in which:

FIG. 1 is a side elevational and fragmentary view of an embodiment of the invention mounted on a crankshaft drivingly engaging a camshaft.

FIG. 2 is a perspective view of the end of the crankshaft shown in FIG. 1;

FIG. 3 is a perspective view of the hub shown in FIG. 1;

FIG. 4 is a perspective view of the sprocket fitted upon the hub as shown in FIG. 3;

FIG. 5 is a perspective view of the oil slinger shown in FIG. 1;

FIG. 6 is a perspective view of the coil compression spring shown in FIG. 1;

FIG. 7 is a perspective view of the locking cap shown in FIG. 1;

FIG. 8 is a cross-sectional view of the hub shown in FIG. 3;

FIG. 9 is a chart illustrating the inertial and frictional losses of the valve train as opposed to RPM of the crankshaft;

FIG. 10 is a cross-sectional view of a second embodiment of the hub; and

FIG. 11 is a side elevational fragmentary view of a third embodiment showing two coaxially mounted springs for controlling the axial movement of the hub.

DETAILED DESCRIPTION OF THE PREFERRED EMBODIMENTS

Referring to FIG. 1, a phase controlling device 12 suitable for controlling the timing of the camshaft of an internal combustion engine is shown. The device 12 is generally shown mounted about a reduced diameter end 14 of crankshaft 16. The basic parts of the phase controlling device 12 are a central hub 18 coaxially mounted about the reduced diameter 14, a sprocket 20 coaxially mounted about hub 18 and keyed thereto by key 22, a locking cap 24 fixed onto the reduced diameter end 14 and journaled within aperture 26 of engine block 28, a compression spring 30 fitted between the hub 18 and locking cap 24, and a chain 32 trained around sprocket 20 and drivingly engaging a conventional camshaft 25 through sprocket 23 rigidly mounted thereon. In addition, an oil slinger 34 is keyed to hub 18.

The crankshaft 16 passes through aperture 26 of engine block 28 with a bearing 29 therebetween. The reduced diameter end 14 of crankshaft 16 extends through an aperture 27 of chain cover 31. In addition, a protective sleeve 33 fits about compression spring 30 and also passes through the aperture 27. A seal 35 seals aperture 27 so that external dirt is prevented from passing into the phase controlling device assembly 12.

The individual structure of the parts are more clearly shown by referring to FIGS. 2 through 7. FIG. 2 discloses the reduced diameter end 14 of crankshaft 16. The reduced diameter has a tracking post 36 extending through the diameter end 14 with two ends 38 and 39 protruding from opposing positions on the cylindrical surface of end 14. In addition, a tapered aperture 40 is axially spaced from tracking post 36 toward the end of the crankshaft 16.

FIGS. 3 and 8 show the sleeve type hub 18 with axially extending key 22 projecting from its outer surface 42. A pair of helical grooves 48 and 49 formed on the inner surface 43 of the hub 18 receive thereon, respectively, the tracking post ends 38 and 39 projecting from shaft end 14. The two helical grooves 48 and 49 each have the same slope and are 180 degrees offset from each other such that the tracking post ends 38 and 39 will ride smoothly in both helical grooves through the distance of the grooves. The hub 18 with integral key 22 has outer dimensions small enough to slidably fit within protective sleeve 33 as shown in FIG. 1.

Referring to FIG. 4, the sprocket 20 has a toothed outer periphery 50 and a central bore 52 with a keyway 54 therein. The bore 52 is sized to receive the hub 18 and keyway 54 is sized to receive key 22 of hub 18. In this fashion the sprocket is non-rotatably connected to hub 18 while allowing axial movement therebetween. The teeth 50 engage the chain 32 shown in FIG. 1 which is also trained about the camshaft 25 in a conventional manner.

Referring now to FIG. 5, the oil slinger 34 also has a central aperture 56 with a keyway 58 therein to receive the hub 18 and its key 22 in the same fashion as the sprocket to non-rotatably connect it thereto while allowing axial relative freedom therewith. The oil slinger has a curved outer perimeter 60 which is shaped to sling oil coming into contact therewith onto the chain and sprocket. As shown in FIG. 1, the inner perimeter 62 of oil slinger 34 abuts against the side 63 of sprocket 20 while the outer perimeter 60 abuts against the wall cover 31 to give it a longitudinal stability with respect to the crankshaft.

Referring now to FIG. 6, the compression spring 30 is formed into a coil of a diameter to seat at one end against the end face 44 of hub 18. The spring 30 has sufficient rigidity or compressive resistance to not be displaced by crankshaft angular accelerations and decelerations while being soft enough to be responsive to camshaft frictional and inertial loads which are dependent upon rotational speed of the camshaft.

Referring now to FIG. 7, the locking cap 24 has a central aperture 71 sized to receive the reduced end diameter 14 of the crankshaft 16. The locking cap 24 also has a tapered aperture 66 through the wall cap 24 size to receive a locking pin 72, as shown in FIG. 1. The end face 70 of locking cap 24 serves as a seat for the outer coiled end of the spring 30. The outer cylindrical surface 68 has a diameter dimensioned to receive conventional balancers and other accessories if desired. The tapered aperture 66 is alignable with tapered aperture 40 of end 14 in which lockpin 72 is inserted therethrough and locks the reduced end diameter 14 of crankshaft 16 rigidly with locking cap 24.

In operation, the crankshaft 16 is a driving shaft which powers the camshaft 25 to operate intake and exhaust valves of the internal combustion engine. In most engines, it is desirable to have the valves operate in the slightly advanced position, i.e., the intake valve opens slightly before the piston reaches its top dead center position and the exhaust valve opens slightly before the piston reaches its bottom dead center position. As engine speed increases it is desirable to retard the operation of the exhaust valves with respect to the piston stroke. Retarding the opening of the exhaust valve prolongs the power stroke and renders more power from the engine at high speeds. Since the exhaust valves are operated by the camshaft and the piston is operated directly by the crankshaft, it is necessary to change the rotational phase or relative positions of the camshaft and crankshaft. Since the sprocket 20 is rotationally fixed through chain 32 to the camshaft 25, alteration of the rotational position of the sprocket 20 with respect to the crankshaft 16 also alters the camshaft 25 rotational position with respect to the crankshaft 16.

The sprocket 20 is keyed onto hub 18 so that their rotational positions are fixed together. The hub 18 is pushed onto the reduced diameter end 14 of crankshaft 16 by compression spring 30 which forces the hub to turn with respect to crankshaft end 14 as the helical grooves 49 and 48 follow tracking post ends 38 and 39 respectively.

As the crankshaft turns, as shown in a clockwise direction in FIG. 2, the hub 18 attains a position determined by the forces exerted by compression spring 30. As the crankshaft 16 picks up speed, the frictional and inertial loads on the camshaft 25 will start to increase causing a retarding force which is transferred to the sprocket 20 through chain 32. The sprocket transfers the retarding load onto the hub 18. The hub 18 then lags behind with respect to the rotation of the crankshaft 16. As the hub 18 rotation retards a few degrees with respect to the crankshaft end 14, the helical grooves 48 and 49 tracked by post ends 38 and 39, respectively, cause the hub 18 to move axially outwardly toward the end of crankshaft end 14 against the force of spring 30. The retarding action ceases when the compressed spring resilient force equals the inertial and frictional loads exerted by the camshaft onto hub 18. At such a point, equilibrium is again established and the hub 18 rotates as if fixed to the crankshaft end 14.

As the crankshaft further picks up speed, further retardation occurs due to high frictional and inertial loads on the camshaft transmitted to the hub 18 to cause the camshaft to further lag behind the crankshaft angle and thereby causing the intake and exhaust valve operation to retard with respect to the respective top dead center and bottom dead center positions of the piston stroke.

The reverse is true when the crankshaft slows down from a high RPM. As the crankshaft 16 slows down, the high camshaft inertial loads cause the camshaft to simultaneously slow down. As the camshaft slows, the camshaft decreases its inertial and frictional loads which are transferred to the hub. Since the inertial and frictional loads are decreased, the force exerted by the compressed spring 30 then is sufficient to overcome the frictional and inertial loads and causes the spring 30 to expand and to axially move the hub 18 inward and cause it to rotate in an advanced direction with respect to the rotating crankshaft end 14. Compression spring 30 continues to expand until the force it exerts on the hub is again counterbalanced by the decreased inertial and frictional loads of the camshaft.

In this fashion, as the crankshaft speed is increased and the camshaft loads are increased, the valve operation is retarded due to camshaft retardation with respect to the crankshaft and when crankshaft speeds are decreased, the valve retardation is decreased due to the spring forcing the hub toward an advanced position as the spring force seeks an equilibrium with the frictional and inertial loads of the camshaft.

As the hub 18 moves axially along the reduced diameter end 14 due to the axial component of force exerted on helical grooves 48 and 49 tracked by the post ends 38 and 39, the sprocket 20 and oil slinger 34 will maintain an axially fixed position with respect to the crankshaft rather than the hub due to the hub 18 sliding through the apertures 52 and 56. In this fashion, binding forces exerted on chain 32 which is trained about sprocket 20 are kept to a minimum.

Since the retardation force of the camshaft 25 is substantially greater than the acceleration or deceleration force of the crankshaft 16, compression spring 30 is made sufficiently stiff to be only responsive to such high inertia loads of the camshaft and non-responsive to any acceleration and deceleration forces of the crankshaft. By having the spring sufficiently stiff to be non-responsive to crankshaft acceleration and deceleration, valve retardation is dependent only upon RPM of the engine and independent of the acceleration of the engine rotational speed.

Referring now to FIG. 9, the inertial and frictional loads of the camshaft of a typical engine are plotted against enging RPM. As shown, there is an area 74 which the inertial and frictional loads of the camshaft 25 either plateau out or become lower as engine RPM is increased. If inertial and frictional loads are decreased as RPM is increased, the force of spring 30 will cause the hub 18 to advance slightly as the engine RPM is increased in this area. It may be desirable to desensitize the valve retardation with respect to engine speed when the engine speed is optimal as shown in FIG. 9.

The desensitization of the phase controlling device 12 can be accomplished by shaping the helical grooves 48 and 49 such that the slopes of the grooves become steeper in an area 76 and 78, respectively, as shown in FIG. 10 such that much more axial travel is required for the same amount of angular change for the hub 18 as it tracks about the tracking post ends 38 and 39. Sections 76 and 78 are calibrated along helical grooves 48 and 49 to engage tracking post ends 38 and 39 when the engine RPM attains the indicated optimal RPM.

It may also be desirable that the angular rate of retardation with respect to engine speed becomes lower when engine speeds are above a certain RPM. This can be accomplished by a third embodiment as shown in FIG. 11 wherein a second spring 80 is coaxially mounted with spring 30. However, the end 82 of spring 80 is axially spaced from the end face 44 of hub 18 such that it does not exert any compressive forces until the hub travels at a predetermined longitudinal distance as indicated by numeral 84. After the hub travels this distance 84, the compression spring 80 exerts its compressive force in addition to the already present longitudinal forces exerted by compression spring 30. Because the resilient forces exerted by the springs 30 and 80 are additive, the springs 30 and 80 cause the hub 18 to retard at a lower rate at high engine RPM's.

In this fashion, retardation of the valve operation of an internal combustion engine which increases the engine efficiency at high speeds is easily achieved by use of an easily constructed phase controlling device that has a minimum number of parts and is independent of any hydraulic controls or other servo-mechanisms.

Variations and modifications of the present invention are possible without departing from its scope and spirit as defined by the appended claims.

The embodiments of the invention in which exclusive property or privilege is claimed are defined as follows:

1. A phase controlling system between a rotatable driving shaft and a rotatable driven shaft, said system comprising:
   a driving member coaxially mounted about one of said shafts for movement relative thereto;
   said driving member drivingly engaged to said driven shaft and drivenly engaged to said driving shaft;

load responsive means connecting said driving member to said one shaft constructed to cause movement having angular and axial components of said driving member relative to said one shaft in proportional response to a torque load on said driven shaft whereby the angular phase relationship between said driving and driven shaft is established in a manner proportional to said torque load.

2. A phase controlling system as defined in claim 1 and comprising said load responsive means including spring means constructed to prevent movement of said hub relative to said one shaft when said torque load is below a predetermined minimum.

3. A phase controlling system as defined in claim 1 and comprising;
   said load responsive means including spring means constructed to prevent movement of said hub relative to said one shaft when said torque load is below a predetermined minimum,
   said spring means being further constructed to resiliently resist movement of said hub relative to said one shaft when said torque load exceeds said predetermined minimum.

4. A phase controlling system as defined in claim 1 wherein;
   said driving member having a central bore through which said one shaft extends;
   said driving member having a cylindrical inner surface about said bore;
   said load responsive means include track means which comprises:
   a helical groove on one of said cylindrical inner surface or a cylindrical outer surface of said one shaft;
   a tracking post radially extending from the other of said surfaces and engaging said helical groove.

5. A phase controlling system as defined in claim 4 wherein;
   said spring means comprise;
   a coil compression spring coaxially mounted about said one shaft with an end abutting a face end of said hub and another end abutting a radially extending shoulder longitudinally fixed to said one shaft;
   said hub moving axially along said coaxial shaft in response to the force of said compression spring until the force exerted by said spring for a given rotational speed of said shaft balances the axially directed force of the track means.

6. A phase controlling system as defined in claim 4 wherein said driving member comprises;
   a hub and a peripheral section keyed to said hub for torque transfer therebetween while allowing axial movement of said hub relative to said peripheral section to permit the outer peripheral section to remain in a substantially fixed relationship to said one shaft as said hub axially moves relative thereto.

7. A phase controlling system as defined in claim 5 wherein;
   said helical groove has a varying slope at a portion thereof to vary the rate of angular retardation at a given rotational speed of said shafts.

8. A phase controlling system as defined in claim 6 wherein;
   a second comprssion spring is mounted coaxially about said first spring such that the second spring is axially spaced from one of said shoulder and said face end of said hub such that upon a predetermined axial movement of said hub, said second spring abuts said face end of said hub and said shoulder and exerts a biasing force thereon to balance, with the force of said first spring, the said torque load exerted on said hub.

9. A valve timing device for an internal combustion engine comprising;
   a driving member including a hub having a central bore therethrough and a peripheral section keyed thereto for torque transfer therebetween while allowing axial movement of said hub relative to said peripheral section;
   said hub coaxially mounted to one of the camshaft or crankshaft of said engine for movement relative thereto;
   said hub and outer peripheral section of said driving member drivenly engaged to said crankshaft and drivingly engaged to said camshaft;
   a helical tracking means interposed between said hub and said one shaft for angularly changing the relative positions of said driving member with respect to said one shaft as the hub axially moves relative to said one shaft with said camshaft, having a retarding torque load exerted thereon, operably applying a torque load on said hub;
   a coil compression spring coaxially mounted about said one shaft and in biasing relationship between said hub and shaft for biasing the hub axially along said one shaft for preventing movement of said hub relative to said one shaft when a torque load on said camshaft is below a predetermined minimum as said crankshaft and camshaft rotate and to resiliently resist movement of said hub relative to said one shaft when said torque load exceeds said predetermined minimum such that the axial and angular movement of said hub relative to said one shaft and thereby the angular retardation of said camshaft relative to said crankshaft is proportional to said torque load on said cam shaft.

10. A valve timing device as defined in claim 9 wherein;
    said helical tracking means comprises;
    a helical groove on one of a cylindrical inner surface of said hub or a cylindrical outer surface of said one shaft;
    a tracking post radially extending from the other of said surfaces and engaging said helical groove;
    said helical groove having a varying slope on a portion thereof to vary the rate of angular retardation of said camshaft relative to said crankshaft at a given range of torque loads on said camshaft.

11. A valve timing device as defined in claim 9 wherein;
    a second compression spring is mounted coaxially with said first spring such that said second spring exerts a biasing force onto said hub in addition to the biasing force of said first spring only after said hub is axially moved a predetermined amount such that above a predetermined torque load on said camshaft, said rate of retardation of said camshaft relative to said crankshaft is lowered.

12. A phase controlling system between a rotatable driving shaft and a driven member, said system comprising;
    a hub coaxially mounted about said driving shaft for rotational and axial movement relative thereto;
    said hub drivingly engaged to said driven member and drivingly engaged to said driving shaft;

spring means for controlling the axial movement of said hub along said driving shaft and counterbalancing an axial directed force from said inertial and frictional loads of said driven member to allow predetermined angular and axial changes of said hub about said driving shaft for changes in the load of said driven member such that for rotational speeds of said driving shaft, said driven member is predeterminedly phase retarded with respect to said driving shaft as compared to said relative phase of said driving shaft and driven member at rest;

said spring means having sufficient strength not to respond to normal angular accelerations and decelerations of said driven member.

* * * * *